(12) United States Patent
Tanaka et al.

(10) Patent No.: US 9,047,829 B2
(45) Date of Patent: Jun. 2, 2015

(54) IMAGE DISPLAY APPARATUS

(75) Inventors: Kazuhiko Tanaka, Fujisawa (JP); Yasutaka Tsuru, Yokohama (JP); Yuya Ogi, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 722 days.

(21) Appl. No.: 12/781,239

(22) Filed: May 17, 2010

(65) Prior Publication Data
US 2010/0295879 A1   Nov. 25, 2010

(30) Foreign Application Priority Data

May 19, 2009   (JP) ................................. 2009-120969

(51) Int. Cl.
*G09G 3/34*   (2006.01)
*G02F 1/1335*   (2006.01)

(52) U.S. Cl.
CPC ...... *G09G 3/3426* (2013.01); *G09G 2320/0238* (2013.01); *G09G 2320/0247* (2013.01); *G09G 2320/0646* (2013.01); *G09G 2330/021* (2013.01); *G02F 1/1336* (2013.01); *G02F 2001/133601* (2013.01)

(58) Field of Classification Search
CPC ...... G09G 3/34; G09G 3/3406; G09G 3/3426
USPC ................................................. 345/173–178
See application file for complete search history.

(56) References Cited

U.S. PATENT DOCUMENTS

| | | | |
|---|---|---|---|
| 7,330,172 B2 | 2/2008 | Itoh et al. | |
| 2005/0007389 A1* | 1/2005 | Kumamoto et al. | 345/690 |
| 2005/0104839 A1* | 5/2005 | Baik | 345/102 |
| 2007/0285379 A1* | 12/2007 | Jung et al. | 345/102 |
| 2009/0273558 A1* | 11/2009 | Lee | 345/102 |
| 2010/0214325 A1 | 8/2010 | Koyama et al. | |

FOREIGN PATENT DOCUMENTS

| | | |
|---|---|---|
| JP | 2009-037000 | 2/2009 |
| WO | 2009/044828 A1 | 4/2009 |

OTHER PUBLICATIONS

H.F. Chen et al., Backlight Local Dimming Algorithm for High Contract LCD-TV, Proc of ASID'06, New Delhi, pp. 168-171, Oct. 8-12, 2006.

\* cited by examiner

*Primary Examiner* — Dennis Joseph
(74) *Attorney, Agent, or Firm* — Mattingly & Malur, PC

(57) ABSTRACT

An image display apparatus includes a dimming value determination circuit for determining a dimming value of a backlight based on an input image signal, an image signal compensation circuit for compensating the input image signal supplied to a liquid crystal panel in accordance with the dimming value, and a backlight drive circuit for driving and controlling the backlight in accordance with the dimming value. When the light emitting luminance of the present frame of the backlight increases relative to the light emitting luminance of the previous frame, the backlight drive circuit delays the timing for applying the dimming value of the present frame. This makes it possible to reduce power consumption of the backlight by suppressing deterioration in the image quality in spite of the sharp change in the display image luminance.

2 Claims, 15 Drawing Sheets

FIG. 2
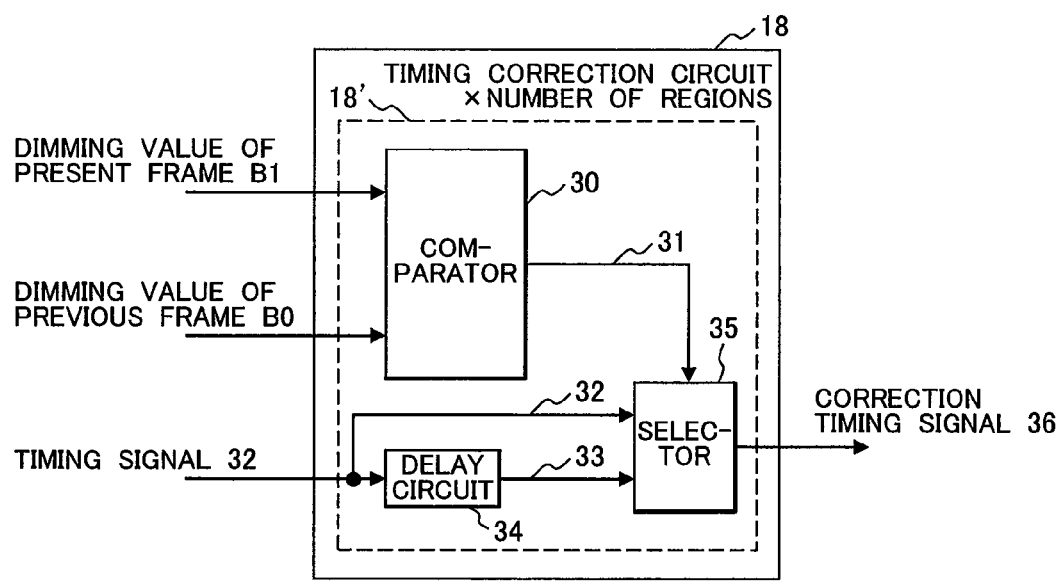
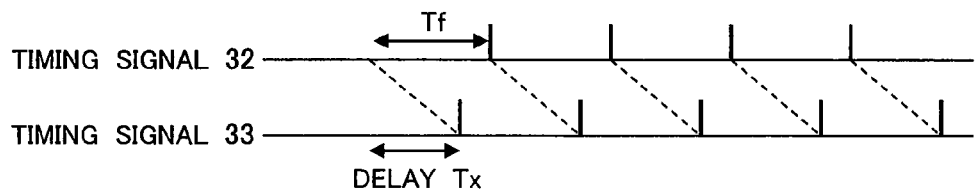

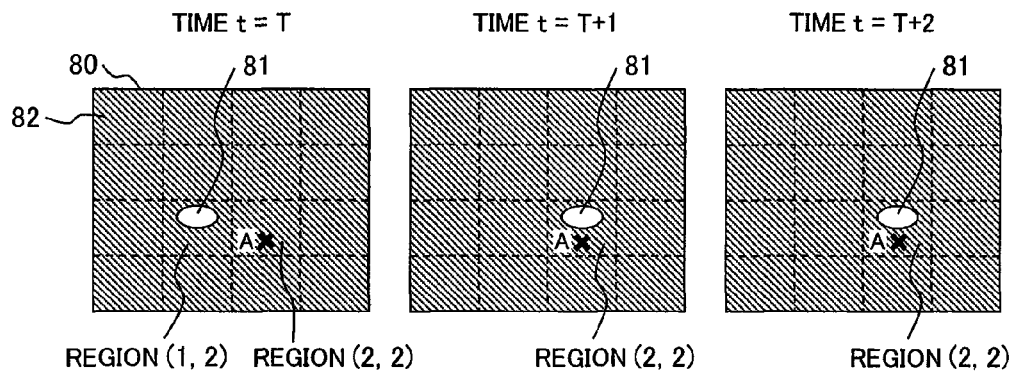

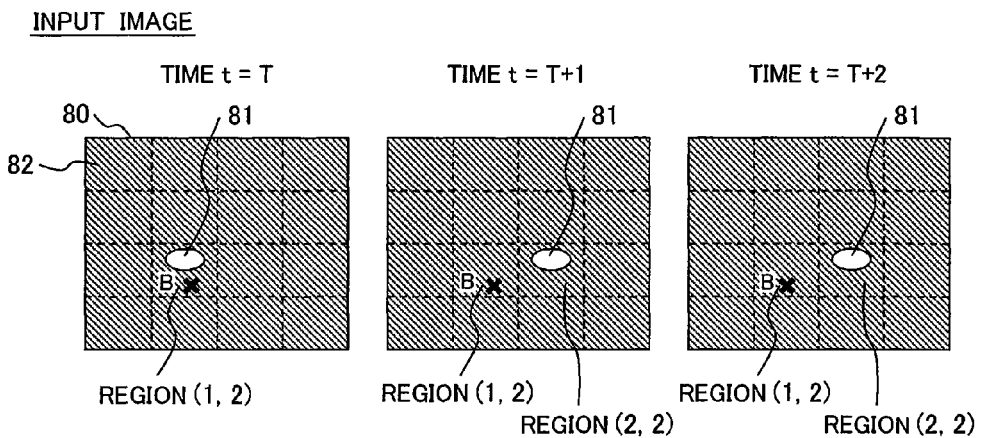

EXAMPLE SETTING OF REGION (0, 0)

|  | BACKLIGHT LUMINANCE B | LC ELEMENT TRANSMIT- TANCE L | DISPLAY LUMINANCE Y | FEASIBILITY |
|---|---|---|---|---|
| COMBINATION 1 | 100 | 20 | 2000 | FEASIBLE |
| COMBINATION 2 | 50 | 40 | 2000 | FEASIBLE |
| COMBINATION 3 | 20 | 100 | 2000 | FEASIBLE (OPTIMUM) |
| COMBINATION 4 | 10 | 200 (UNFEASIBLE) | 2000 | UNFEASIBLE |

SETTING OF BACKLIGHT LUMINANCE B

| 20 | 20 | 20 | 20 |
|----|-----|----|----|
| 20 | 20 | 20 | 20 |
| 20 | 100 | 20 | 20 |
| 20 | 20 | 20 | 20 |

REGION (1, 2)

SETTING OF LC TRANSMITTANCE L

L=100    L=20    L=100

REGION (1, 2)

IMAGE DISPLAY APPARATUS

CLAIM OF PRIORITY

The present application claims priority from Japanese patent application serial No. JP 2009-120969, filed on May 19, 2009, the content of which is hereby incorporated by reference into this application.

BACKGROUND OF THE INVENTION (1) Field of the Invention

The present invention relates to an image display apparatus which uses a light source unit to display an input image on a display panel.

(2) Description of the Related Art

In the case where the display device such as a liquid crystal display panel uses a backlight as the light source (light source unit) instead of emitting light by itself, the power consumption of the backlight occupies a major part of that of the display device. Reduction of the backlight power consumption is effective for reducing the entire power consumption of the display device. For example, amount of light from the backlight is reduced when displaying a dark image on the screen so as to reduce the power consumption. When the light amount of the backlight is simply reduced to the Nth part, the brightness of the screen may be reduced to the Nth part as well. If the light amount of the backlight is reduced to the Nth part while increasing the transmittance N times by compensating the value of each liquid crystal pixel to be brighter, the desired brightness on the screen may be maintained.

As to how far the light amount of the backlight may be reduced, that is, the upper limit of the value of N depends on the maximum value of the transmittance of the liquid crystal pixel (maximum transmittance). The N value may be adjusted to maximize the transmittance of the brightest pixel in the display image for maximizing the N to the extent that the brightness of the display image is not saturated. The method for collectively controlling the backlight luminance value (1/N) of the whole screen is called global dimming. N value is susceptible to the luminescent spot at least at one position existing on the screen in the global dimming, and accordingly, the luminance of the entire backlight is increased. The method may fail to provide the effect for reducing the power consumption in case of the image with high contrasting distribution on the screen.

In order to solve the aforementioned problem, so called local dimming (or area control) has been proposed (see H. F. Chen "Backlight Local Dimming Algorithm for High Contrast LCD-TV", Proc. of ASID (2006), pp. 168-171 as Non-Patent Document 1). In the method, the screen is divided into plural regions, and each light source corresponding to the divided region one-on-one is provided for independently controlling the light emitting intensity of each of the respective light sources. The method applies the global dimming for each of the divided regions, and the light emitting intensity corresponding to the light source is determined based on the pixel value inside the region. The aforementioned process is executed for all the regions in the screen to control the backlight luminance in the respective regions independently. At the same time, the pixel value of the input image is compensated in accordance with the light emitting intensity of each light source of the respective regions. The aforementioned control is capable of reducing the power consumption more efficiently even if the input image has high contrast on the screen.

The local dimming is executed for controlling the backlight luminance in each of the divided regions. Difference in the backlight luminance between the regions may make the boundary therebetween visible. Especially when displaying the video image, not only the difference in the backlight luminance among the regions but also change in the backlight luminance of the respective regions along the time axis may cause flickering of the image because the image on the display screen fails to be smoothly switched apparently. Inappropriate control along the time axis may visually deteriorate the image quality. For example, U.S. Pat. No. 7,330,172 as Patent Document 1 proposes the control for changing output property so as to rapidly increase the luminance in response to the change in the display screen of the display panel from dark to bright, and to gently increase the luminance in response to the change in the display screen from bright to dark.

SUMMARY OF THE INVENTION

Under the control disclosed in Patent Document 1, the rate for changing the backlight luminance along the time axis is retarded for changing the screen from bright to dark so as to display the video image with the contrast conforming to the visual feature of a viewer. In this case, the filter circuit serving to delay by several frames is used.

In the case where the rate for changing the backlight luminance along the time axis is retarded over several frames, the control for changing the backlight luminance may fail to cope with the video image having the display image luminance sharply changed. As a result, the brightness of the display screen unnaturally changes, thus deteriorating image quality. The time period for which the luminance of the backlight is held high is increased, suppressing the effect for reducing the power consumption.

The present invention provides an image display apparatus for displaying an image on the display panel while controlling the backlight luminance so as to reduce the backlight power consumption by suppressing deterioration in the image quality in spite of sharp change in the luminance of the display image.

The present invention provides an image display apparatus for displaying an image using a display panel formed by arranging plural transmittance variable elements each having a light transmittance variable in accordance with a signal of an input image and a light source unit for generating a light irradiated to the display panel. The apparatus includes a dimming value determination unit which determines a dimming value for setting a light emitting luminance of the light source unit based on the signal of the input image, an image signal compensation unit which compensates the signal of the input image supplied to the display panel in accordance with the dimming value determined by the dimming value determination unit, and a drive control unit which drives and controls the light source unit in accordance with the dimming value determined by the dimming value determination unit.

The drive control unit compares the light emitting luminance of the light source unit obtained when applying the dimming value of a present frame with the light emitting luminance obtained when applying the dimming value of a previous frame. When the light emitting luminance of the present frame increases, the drive control unit delays a timing for applying the dimming value of the present frame compared with the timing when the light emitting luminance of the present frame decreases for driving the light source unit.

The drive control unit compares the light emitting luminance of the light source unit when applying the dimming value of the present frame with the light emitting luminance when applying the dimming value of the previous frame to apply the dimming value of the previous frame as that of the present frame when the light emitting luminance of the present frame increases. The drive control unit directly applies the dimming value of the present frame when the light emitting luminance of the present frame decreases for driving the light source unit.

The present invention provides an image display apparatus for displaying an image using a display panel formed by arranging plural transmittance variable elements each having a light transmittance variable in accordance with a signal of an input image and a light source unit for generating a light irradiated to the display panel. The apparatus includes a dimming value determination unit which determines a dimming value for setting a light emitting luminance of the light source unit based on the signal of the input image, an image signal compensation unit which compensates the signal of the input image supplied to the display panel in accordance with the dimming value determined by the dimming value determination unit, a dimming value correction unit which corrects the dimming value to have a time taken for an intermediate value between the dimming values before and after switching of the dimming value determined by the dimming value determination unit, and a drive control unit which drives and controls the light source unit in accordance with the dimming value corrected by the dimming value correction unit.

The present invention makes it possible to reduce the backlight power consumption while suppressing deterioration of the image quality irrespective of sharp change in the luminance of the display image.

BRIEF DESCRIPTION OF THE DRAWINGS

These and other features, objects and advantages of the present invention will become more apparent from the following description when taken in conjunction with the accompanying drawings wherein:

FIG. 2 illustrates an example of an inner structure of a timing correction circuit 18;

FIGS. 3A to 3C illustrate an example of the display image (dark to bright) and a setting example of the backlight luminance corresponding to the image;

FIGS. 5A to 5C illustrate an example of the display image (bright to dark) and a setting example of the backlight luminance corresponding to the image;

DETAILED DESCRIPTION OF THE EMBODIMENT

An embodiment is intended to provide an image display apparatus for displaying an image on the liquid crystal panel as the example of the image display panel by irradiating the light from the light source unit (backlight as the light source) without emitting by itself. Firstly, the local dimming (area control) as a basic method for controlling the backlight luminance employed as the embodiment will be described referring to FIGS. 17 to 21.

Figure 17:
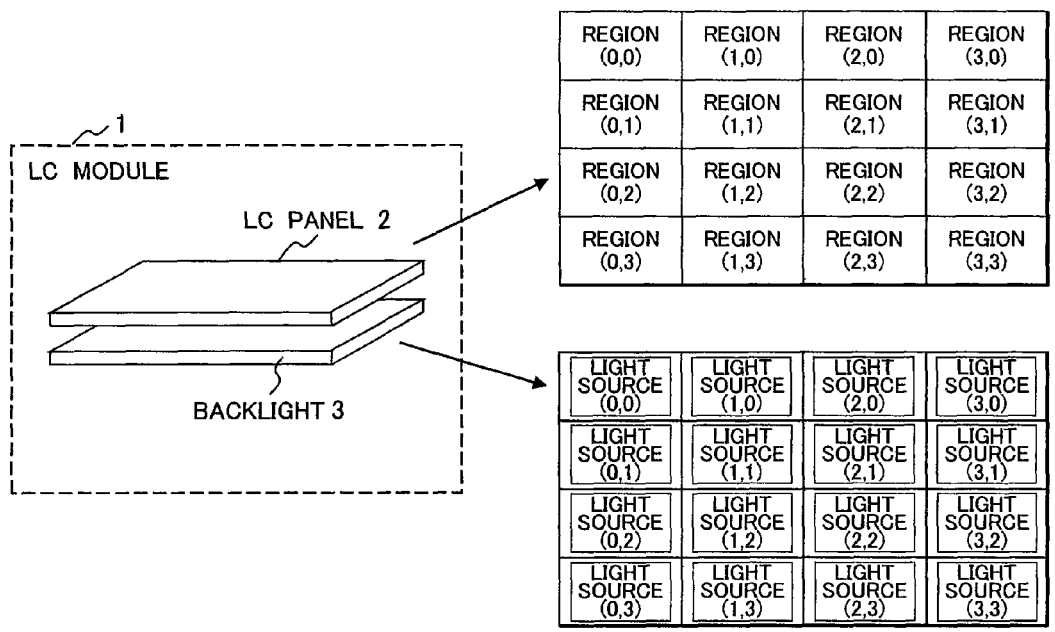
FIG. 17 represents a relationship between the liquid crystal panel regions and the backlight light sources.

FIG. 17 represents a relationship among regions of the liquid crystal panel and the backlight light sources. The image signal input into a liquid crystal module 1 is displayed on a liquid crystal panel 2 having the back surface irradiated by a backlight 3. Each of the backlight 3 and the liquid crystal panel 2 has substantially the same size and oppositely disposed. The liquid crystal panel 2 is formed by arranging plural liquid crystal elements each corresponding to the pixel of the display image on a two-dimensional surface. It is assumed that the resolution of the display image is equal to that of the input image, and each pixel of the display image corresponds to the single liquid crystal element for the purpose of simplifying the explanation. The aforementioned structure corresponds to the monochrome liquid crystal. However, the present invention is not limited to the aforementioned structure, but is applicable to the color liquid crystal which has pixels each formed of plural liquid crystal elements. Each of the liquid crystal elements is a transmittance variable element with the light transmittance variable under the applied voltage. The transmittance of the liquid crystal element corresponding to the value of each pixel of the input image is varied to control the transmission level of the light irradiated from the backlight 3 executed by those liquid crystal elements for displaying the input image on the liquid crystal module 1.

Referring to FIG. 17, the liquid crystal panel 2 is divided into 4 parts both in longitudinal and lateral directions, that is, 16 regions so as to be subjected to the area control. The backlight 3 is also divided into 16 regions corresponding to the respective regions of the liquid crystal panel 2. The backlight 3 is formed of a light source, a light guiding plate, an optical film and the like (not shown). The light source may be formed of plural light emitting elements, for example, LED, and decentrally arranged in the backlight corresponding to the respective regions. This makes it possible to independently control the light emitting luminance of each region.

In the embodiment, the single light source is provided on the center of each of the regions for simplifying the explanation. However, the present invention is not limited to the aforementioned structure. The light emitting luminance of each light source may be independently controlled, and the light rays from the respective light sources are expected to illuminate the corresponding regions on the liquid crystal panel 2 uniformly. For example, the light from the light source (1,2) in the backlight 3 is designed to pass through only the corresponding region (1,2) on the liquid crystal panel 2. The assumption as described above is intended to simplify the explanation to be described below. Application of the present invention will not be interrupted by leakage of the light from each light source to the other region, and failure to uniformly illuminate the corresponding region.

In the ideal case of the liquid crystal module 1, a display luminance Y at the coordinate position (px,py) of the liquid crystal panel 2, that is, the brightness visually recognized by the human is expressed by the following formula (1) using the backlight luminance B to the region with the coordinate and the transmittance L of the liquid crystal element at the coordinate.

$$Y(px,py)=B(px,py)\times L(px,py) \quad (1)$$

It is assumed that the light from each of the light sources uniformly illuminates only the corresponding region on the liquid crystal panel. The backlight luminance B at the coordinate (px,py) is expressed by a formula (2) using a light emitting luminance S at the light source number (ax, ay). The light source number (ax,ay) denotes the number of the backlight as the light source which illuminates the coordinate (px,py).

$$B(px,py) \propto S(ax,ay) \quad (2)$$

The light emitting luminance of the light source may be continuously controlled by appropriately changing the voltage or current to be applied. For example, if the LED is used as the light source, the applied current is subjected to the pulse width modulation for controlling the light emitting luminance of the light source. The method for controlling the light emitting element may be changed in accordance with the type of the light source.

Meanwhile, the transmittance L of the liquid crystal element at the coordinate (px,py) is determined by a pixel value G of the pixel corresponding to the coordinate (px,py) among those forming the input image. The aforementioned relationship may be expressed by a formula (3) using the function f(x). Generally, the function f(x) has a feature close to power profile that should be called gamma function. However, it is not limited to the aforementioned relationship.

$$L(px,py)=f(G(px,py)) \quad (3)$$

Figures 18, 19:
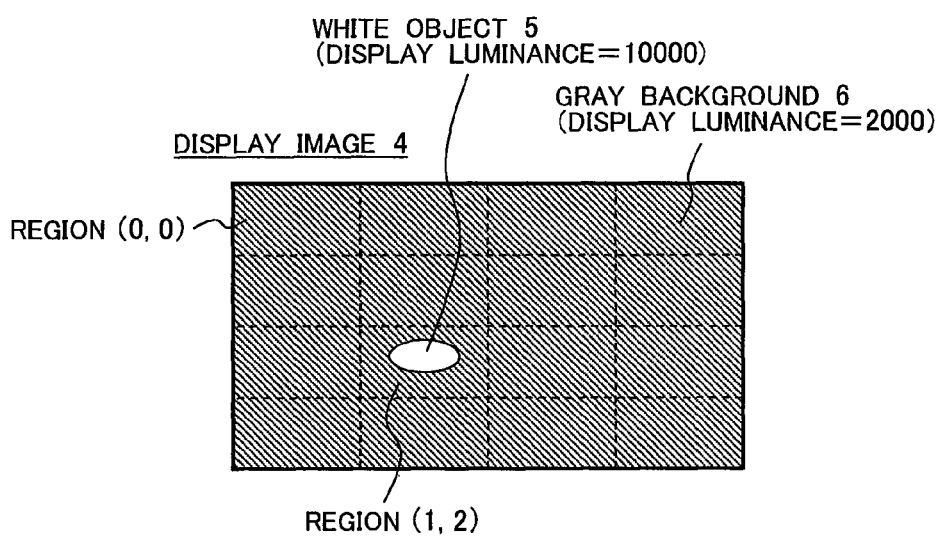
FIG. 18 represents an example of the display image.
FIG. 19 represents an example of combination of the backlight luminance and the liquid crystal transmittance.

It is assumed that an image 4 as shown in FIG. 18 is displayed on the liquid crystal module 1. The image 4 has one white object 5 located on a gray background 6. The dotted line drawn in the figure corresponds to the boundary between the regions of the liquid crystal panel 2 as described referring to FIG. 17. That is, if the image is displayed on the liquid crystal panel 2, the white object 5 and the gray background 6 exist in the region (1,2), and the rest of the regions display only the gray background 6.

The point at the coordinate (px0, py0) in the region (0,0) of the display image 4 will be focused. The display luminance Y of the coordinate is obtained by multiplying the backlight luminance B at the corresponding coordinate by the liquid crystal element transmittance L using the formula (1). In this case, combination of the backlight luminance B and the liquid crystal element transmittance L is considered for establishing the predetermined display luminance Y.

FIG. 19 illustrates an example of the combination between the backlight luminance B and the liquid crystal element transmittance L. Plural combinations are available for establishing the predetermined display luminance Y. Referring to the figure, the value of the backlight luminance B is expressed as the normalized value while setting the maximum available luminance which can be established by the backlight 3 to 100. Likewise the liquid crystal element transmittance L is expressed as the normalized value while setting the maximum transmittance which can be established by the liquid crystal panel 2 to 100. In the following explanation, values of the backlight luminance B and the liquid crystal transmittance L will be expressed as the normalized values. Accordingly, the display luminance Y as the value obtained by multiplication of those values has the maximum value normalized to the value of 10000.

The combination for displaying the pixel with the coordinate (px0, py0) at the display luminance Y of 2000 will be determined. The combination 1 established by setting the backlight luminance B to 100, and the liquid crystal element transmittance L to 20 realizes the display luminance Y of 2000. This combination is feasible as both values of the backlight luminance B and the liquid crystal element transmittance L do not exceed 100. The combinations 2 and 3 are feasible as well since the display luminance Y becomes 2000.

The power consumption of the backlight 3 mainly occupies the power consumption of the liquid crystal module 1. The power consumption is substantially proportional to the luminance of the light emitted by the backlight 3. Meanwhile, the transmittance of the liquid crystal panel 2 will not largely influence the power consumption. In case of the region (0,0), the backlight luminance B of the combination 2 is half the backlight luminance of the combination 1, and accordingly, the power consumption becomes substantially half the value of the combination 1. The backlight luminance B of the combination 3 is ⅕ of the combination 1, and accordingly, the power consumption becomes substantially ⅕ of the value of the combination 1. The lower the backlight luminance B is decreased, the more advantageous the power consumption reduction becomes.

The power consumption of the combination 4 with the backlight luminance B reduced is ⅒ of the combination 1. The liquid crystal element transmittance L of the combination 4 is set to 200 in excess of the maximum value of 100. Accordingly, this combination is unfeasible. If the display is performed in the aforementioned condition, the liquid crystal element transmittance L is limited to the maximum value of 100, and will be saturated with the display luminance Y of 1000. In the embodiment, the combination having the backlight luminance B lowered until the liquid crystal transmittance L of the pixel at the highest luminance in the region becomes 100, that is, the combination 3 is feasible to establish the minimum power consumption of the liquid crystal module 1.

Referring to FIG. 18, the region (1,2) which includes the white object 5 will be considered. In the region, the white object 5 with the display luminance Y set to 10000 is located on the gray background 6 with the display luminance Y set to 2000. The combination with the backlight luminance B set to 100, the liquid crystal transmittance L at the position of the white object 5 set to 100, and the liquid crystal transmittance L of the background 6 set to 20 is only feasible to establish the minimum power consumption in the region (1,2).

Figures 20, 21:
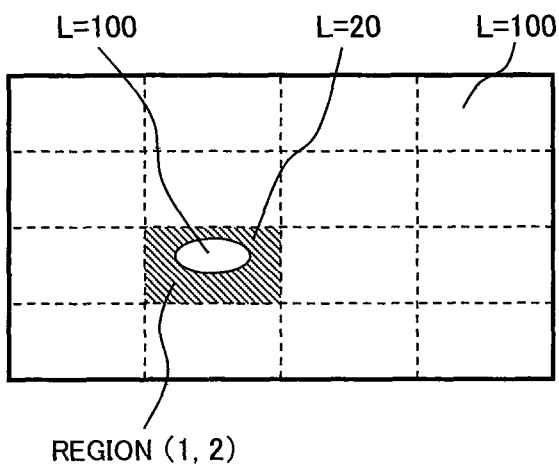
FIG. 20 represents an example of setting the backlight luminance value.
FIG. 21 represents the liquid crystal transmittance after correction.

Considering the aforementioned factors, the backlight luminance B and the liquid crystal transmittance L for displaying the image 4 shown in FIG. 18 on the liquid crystal module 1 may be favorably controlled as represented by FIGS. 20 and 21.

FIG. 20 represents a setting example of the backlight luminance value B. That is, each of the light sources are controlled such that the backlight luminance B of the region (1,2) which includes the white object 5 is only set to 100, and the backlight luminance B of the rest of the region which does not include the white object 5 is set to 20.

FIG. 21 represents a control example of the liquid crystal transmittance L of each pixel. That is, in the region (1,2) which includes the white object 5, the liquid crystal transmittance L of the white object 5 is set to 100, and the liquid crystal transmittance L of the gray background 6 is set to 20. In the other region, the liquid crystal transmittance L of the gray background 6 is set to 100.

The control for minimizing the power consumption using the local dimming (area control) method without saturating the display luminance has been described. Then embodiments of the present invention on the basis of the local dimming method will be described hereinafter.

[First Embodiment]

Figure 1:
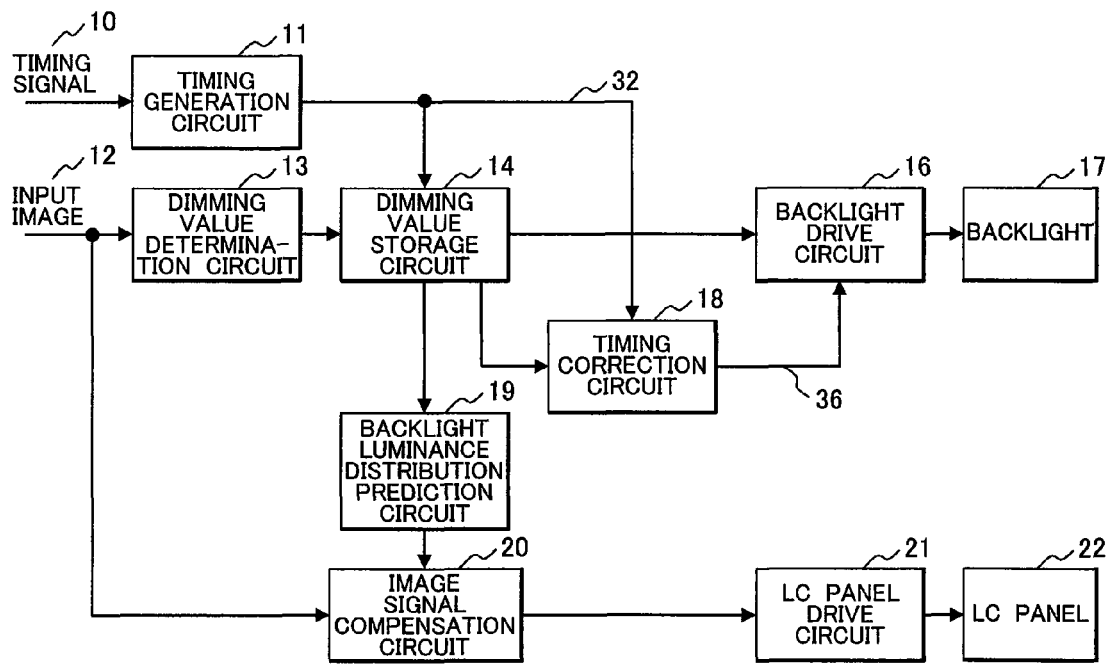
FIG. 1 is a block diagram illustrating an image display apparatus according to a first embodiment of the present invention (first embodiment)

FIG. 1 is a block diagram illustrating an image display apparatus according to a first embodiment of the present invention.

An input image 12 to be displayed and a timing signal 10 indicating timing information of the input image 12 are input to the apparatus. Dot clocks and synchronous signals correspond to the timing signal 10. A timing generation circuit 11 generates various timing signals such as clock, address, and trigger signal based on the input timing signal 10 so as to be supplied to the respective circuits in the apparatus. Those timing signals are only partially described for avoiding the complexity drawing.

A dimming value determination circuit 13 analyzes the input image 12 which has been input, and determines a light emission amount (hereinafter referred to as a dimming value) of each of the light sources for forming a backlight 17. The light emission amount of the light source is determined based on the pixel value with the maximum luminance among those in the region. That is, the formulae (1) to (3) are calculated to determine the luminance B of the corresponding light source such that the liquid crystal transmittance L of the pixel with the maximum luminance in the region becomes the largest possible value (=100) established on the liquid crystal panel. The determination process is an example, and it is clearly understood that the other method may be used for determining the light source luminance. The dimming values of all the light sources may be made the same to execute the global dimming control. The determined dimming value is stored in a dimming value storage circuit 14.

The dimming value stored in the dimming value storage circuit 14 is transmitted to a backlight drive circuit 16 in accordance with the timing signal supplied from the timing generation circuit 11. A timing correction circuit 18 determines a switching direction of the dimming value in the respective regions, and corrects the switching timing of the backlight luminance in accordance with the determination result. As described later, the trend of change (increase/decrease) in the backlight luminance is identified for each region so that the timing for switching the backlight is determined in accordance with the trend to suppress flashing. The backlight drive circuit 16 subjects each of the light sources for forming the backlight 17 to the pulse width modulation in accordance with the input dimming value for controlling the respective light emitting luminance values of the regions.

A backlight luminance distribution prediction circuit 19 predicts a luminance distribution B of the backlight 17 upon dimming control of the respective light sources thereof in accordance with the corresponding dimming values from the dimming value storage circuit 14. An image signal compensation circuit 20 compensates pixel values G of the respective pixels using the predicted backlight luminance distribution B and the formulae (1) to (3), and adjusts such that each display luminance Y of the pixels becomes the same as the value obtained when all the backlight light sources are illuminated with maximum luminance.

The compensated pixel values G are transmitted to a liquid crystal panel drive circuit 21 for controlling the liquid crystal transmittance L of a liquid crystal panel 22. The aforementioned structure is capable of making the display luminance of the actual image substantially the same as the one obtained when the light emitting luminance of the backlight is not reduced even if each light emitting luminance of the respective light sources for forming the backlight 17 is reduced. In this case, the power consumption of the backlight may be reduced by the amount corresponding to the reduced amount of light from the backlight.

FIG. 2 represents an example of the inner structure of the timing correction circuit 18. The timing correction circuit 18 provided with the correction circuits 18' corresponding to the respective regions one-on-one determines a trend of change in the dimming value of the respective regions, and adjusts the switching timing of the backlight luminance. A comparator 30 determines with respect to the trend of change in the dimming value of the subject region (increase/decrease). Assuming that the region to be determined is set to (ax,ay), the dimming value B1 of the present frame region (ax,ay) which has been transmitted from the dimming value storage circuit 14 is compared with the dimming value B0 of the previous frame region (ax,ay), and outputs a comparative determination signal 31. If the dimming value B1 of the present frame is larger than the dimming value B0 of the previous frame, that is, the backlight of the subject region changes from dark to bright, the comparative determination signal 31 is set to 1. Besides the aforementioned case, the signal is set to 0.

A timing signal 32 generated by the timing generation circuit 11 and a timing signal 33 formed by delaying the timing signal 32 by a predetermined time Tx in a delay circuit 34 are input to a selector 35. The selector 35 selects one of the timing signals in accordance with the comparative determination signal 31 from the comparator 30, and outputs the selected signal as a correction timing signal 36 to the backlight drive circuit 16. If the comparative determination signal 31 is set to 0, the timing signal (no delay) 32 generated by the timing generation circuit 11 is selected. If the determination signal 31 is set to 1, the timing signal (delayed) 33 from the delay circuit 34 is selected. The correction timing signals 36 are generated for all the regions, and output as described above.

A timing correction operation according to the first embodiment will be described hereinafter.

Increase in the backlight luminance of the certain region in the screen (dark to bright) will be described referring to FIGS. 3A to 3C, and 4A to 4C.

FIGS. 3A to 3C represent examples of the display image and corresponding setting of the backlight luminance. The backlight luminance is increased in the region (2,2) which includes a point A to be focused in the screen.

FIG. 3A illustrates a display screen 80 for displaying a video image which has a white object 81 on a gray background 82, and its position moving along the time axis. In case of t=T, the object 81 in the region (1,2) moves into the region (2,2) in the next frame (time t=T1). The object in the next frame (time t=T+2) still exists in the region (2,2). Likewise the case as shown in FIG. 18, the white object 81 is assumed to have the display luminance Y set to 10000, and the background 82 is assumed to have the display luminance Y set to 2000.

FIG. 3B represents setting of the backlight luminance B when displaying the video image illustrated in FIG. 3A, and it is determined by the dimming value determination circuit 13. From the aspect as shown in FIG. 20, the region which includes the white object 81 has the backlight luminance B set to 100. Then the region which includes only the background 82 without the white object 81 has the backlight luminance B reduced to 20.

FIG. 3C represents setting of the liquid crystal transmittance L accompanied with setting of the backlight luminance B represented in FIG. 3B based on the pixel value G compensated by the image signal compensation circuit 20. The setting of the liquid crystal transmittance L of the background 82 is represented. Likewise the case shown in FIG. 21, the liquid crystal transmittance L of the background 82 in the region which includes the white object 81 is set to 20 (although not shown, liquid crystal transmittance L of the white object 81 is set to 100). The liquid crystal transmittance L of the background 82 which does not include the white object 81 is increased to 100.

The aforementioned setting allows the display luminance Y of the white object 81 to be set to 10000, and the display luminance Y of the gray background 82 to be set to 2000 in the arbitrary region.

Figure 4A:
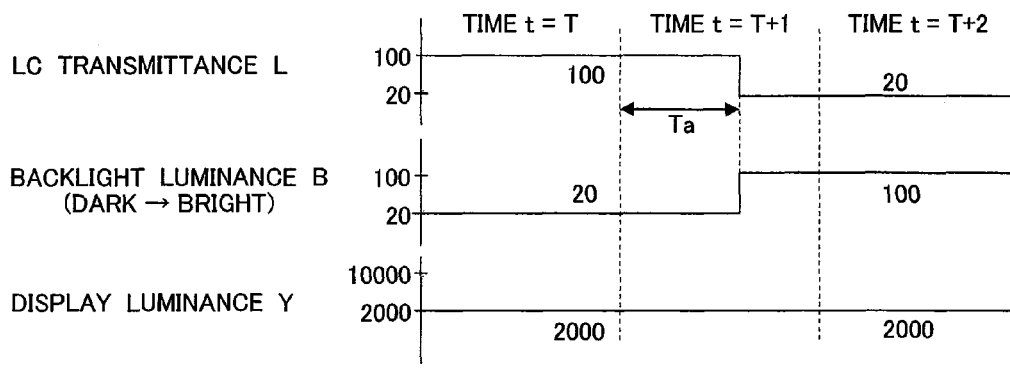
FIGS. 4A to 4C represent each change in the display parameter along a time axis corresponding to FIGS. 3A to 3C, respectively.
Figure 4B:
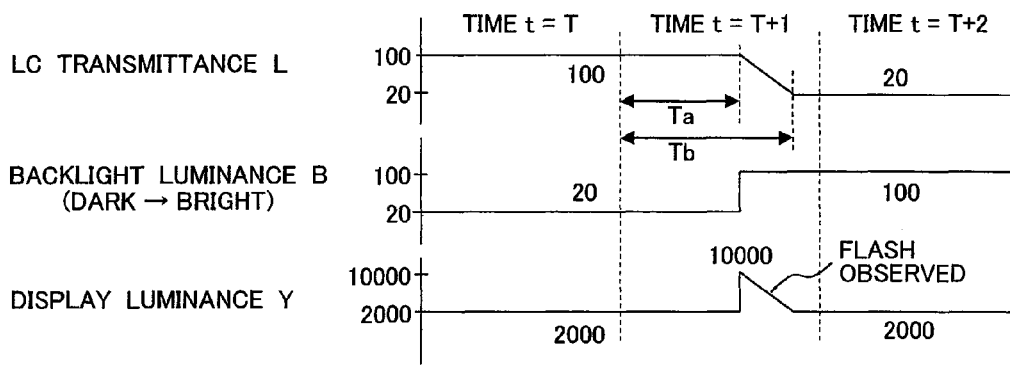
Figure 4C:
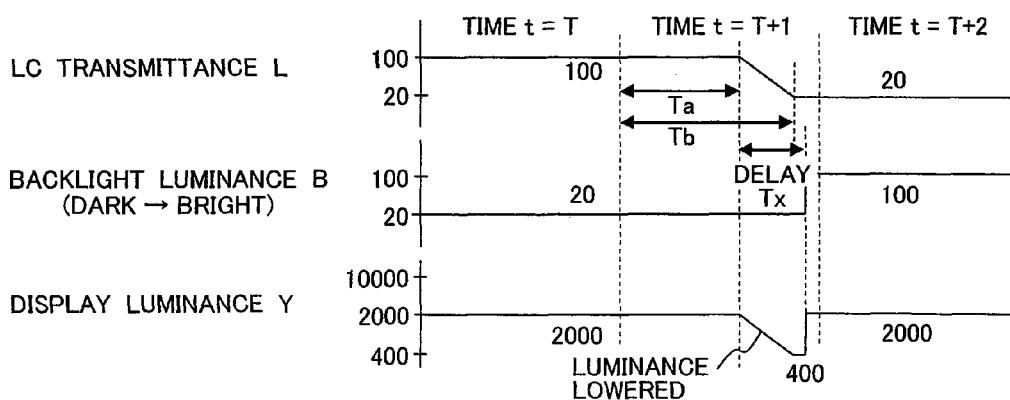

Each of FIGS. 4A to 4C represents a change in the display parameter of the video image display shown in FIGS. 3A to 3C along the time axis (timing chart), respectively. Referring to the point A in the screen shown in FIG. 3A, each change in the liquid crystal transmittance L, the backlight luminance B and the display luminance Y along the time axis is shown. The point A is in the region (2,2), and has the backlight luminance B changed from 20 to 100 (dark to bright) accompanied with movement of the white object 81. It is assumed that the point A is kept included in the gray background 82 even if the white object 81 passes the region (2,2) at time points (T+1) and (T+2).

FIG. 4A represents a parameter change in the ideal state. In the frame at t=T, the liquid crystal transmittance L at the point A is set to 100. In the frame at t=T+1, the liquid crystal transmittance is changed to 20. The resultant change point is delayed by the amount corresponding to the time Ta from the head of the frame at the time t=T+1. The delay is caused by updating the transmittance of each pixel of the liquid crystal panel sequentially along the scanning line. The delay time Ta varies depending on the position of the point A in the screen. Upon scanning operation in the generally employed order, the higher the point A is positioned in the display, the smaller the Ta becomes, and the lower the point A is positioned, the larger the Ta becomes.

Meanwhile, the change in the backlight luminance B along the time axis in the region (2,2) which includes the point A is updated to the dimming value obtained by the dimming value determination circuit 13 in accordance with the timing for updating the liquid crystal transmittance L of the liquid crystal element in the region (2,2). The region includes plural liquid crystal elements, and accordingly each timing for updating the respective elements slightly differs. However, it is assumed that each transmittance of the respective liquid crystal elements in the region is simultaneously updated, based on which the backlight luminance is updated for the purpose of simplifying the explanation. The liquid crystal transmittance L and the backlight luminance B are controlled at the resultant timing. If both values change momentarily, the display luminance Y at the point A becomes constant at the value of 2000 as illustrated in the drawing.

Upon switching of the parameter, as the backlight luminance B is controlled by subjecting the LED to pulse width modulation, the transition hardly takes time. Meanwhile, as the liquid crystal transmittance L is changed by the physical rotation of the particle in the liquid crystal element, the transition needs predetermined time. The transition time varies depending on the response speed of the liquid crystal panel. There may be the panel which requires the time corresponding to several frames for transition of the liquid crystal transmittance.

FIG. 4B illustrates the behavior observed in consideration of the transition time of the liquid crystal transmittance L. Referring to the drawing, the transition of the liquid crystal transmittance L starts upon passage of Ta from the head of the frame at the time t=T+1, and the transition ends after the elapse of Tb from the head of the frame. The transition time is expressed as Tb−Ta, and the transmittance L of the liquid crystal smoothly changes during the transition time. Meanwhile, the backlight luminance B momentarily changes upon passage of Ta from the head of the frame.

The display luminance Y obtained by multiplying the backlight luminance value B by the liquid crystal transmittance L takes the value which is larger than 2000 during the transition time of the liquid crystal transmittance L as shown by the waveform of the display luminance Y in the drawing. In this example, the value reaches the maximum value of 10000. This indicates that the point A is temporarily illuminated with the display luminance of 10000 which is five times brighter than the original display luminance value of 2000. The illumination appears flashing to the human eye, thus largely deteriorating image quality. The deterioration degree of the image caused by the flashing is different depending on the viewer, and accordingly, it is difficult to define the tolerance with respect to the deterioration degree. In the embodiment, the actual luminance which becomes 1.2 times higher than the original display luminance will be defined as the flashing.

FIG. 4C represents the example for delaying the timing for changing the backlight luminance B according to the embodiment for the purpose of reducing the flashing. In this example, the backlight luminance B is changed at the end of transition of the liquid crystal transmittance L (after the elapse of time Tb). In other words, the backlight luminance B is updated after the elapse of sufficient time Tx from the start of transition of the liquid crystal transmittance L. In this case, the value Tx is larger than the value Tb−Ta. At the time point when the transition of the liquid crystal transmittance L starts, the backlight luminance B is kept at 20. Then the display luminance Y starts lowering from the value 2000, and reaches the value 400 at the end of the transition when the liquid crystal transmittance L becomes 20. Thereafter, the display luminance restores the value to 2000 resulting from the change in the backlight luminance B from 20 to 100.

The timing at which the backlight luminance B changes is delayed to allow suppression of flashing in spite of temporary luminance decrease. Unlike the flashing, the temporary luminance decrease is unlikely to be recognized to the human eye owing to the afterimage. The backlight control is delayed upon increase in the backlight luminance B (dark to bright) so as to alleviate the image quality deterioration.

The example for decreasing the backlight luminance of the certain region in the screen (bright to dark) will be described referring to FIGS. 5A to 5C, and FIGS. 6A to 6C, respectively.

FIGS. 5A to 5C represent an example of the display image (bright to dark) and the setting example of the corresponding backlight luminance. The image 80 to be used is the same as the one shown in FIG. 3A. In this case, a point B in the screen is focused, and the backlight luminance of the region (1,2) which includes the point is decreased. The pixel at the point B is located at the position constantly corresponding to the gray background 82 for the time period from T to T+2.

FIG. 5A illustrates the display screen 80. As the white object 81 moves rightward, the backlight luminance distribution B changes as illustrated in FIG. 5B, and the bright region moves rightward. Referring to the point B, the backlight luminance B changes from bright to dark. The liquid crystal transmittance L on the background changes as illustrated in FIG. 5C.

Figure 6A:
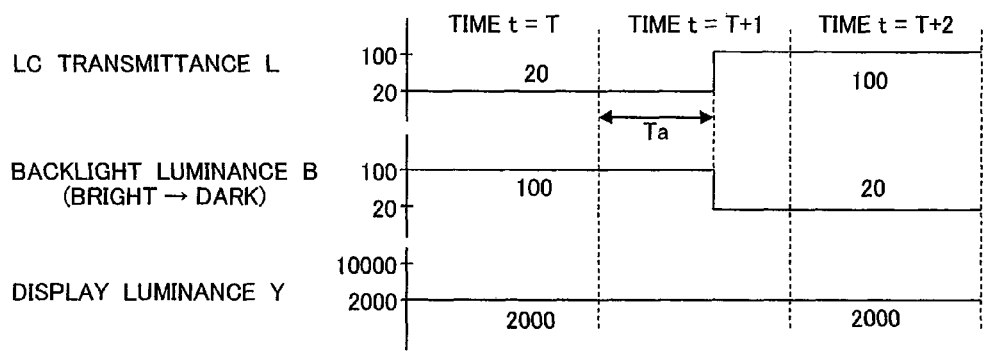
FIGS. 6A to 6C represent timing charts of the display parameter corresponding to FIGS. 5A to 5C, respectively.
Figure 6B:
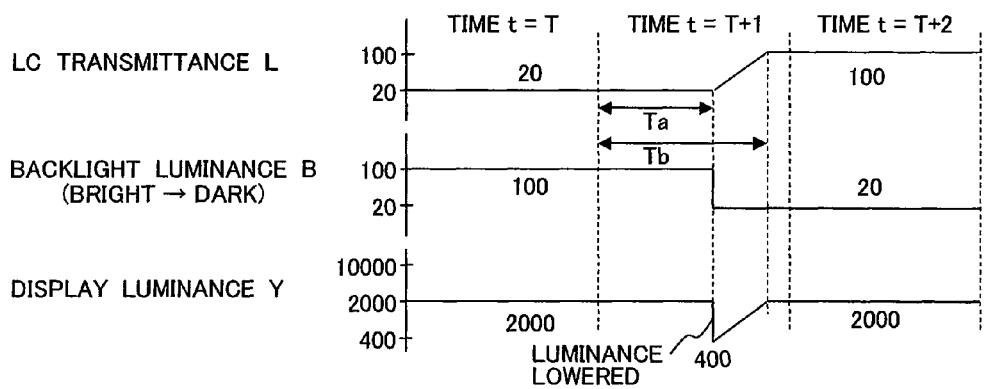
Figure 6C:
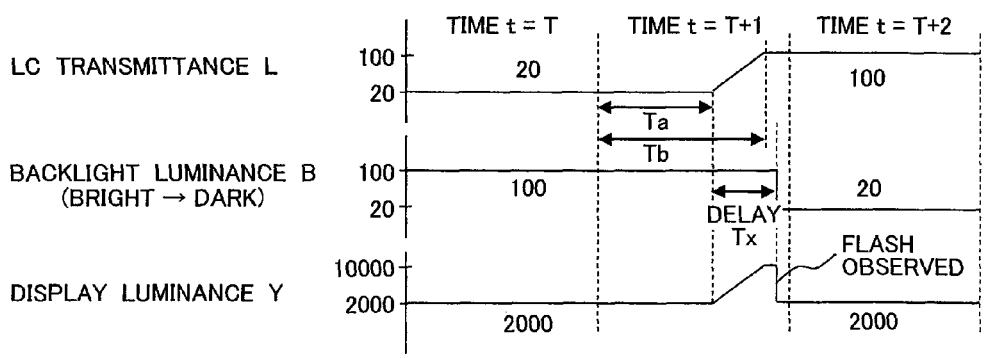

FIGS. 6A to 6C represent the respective changes in the display parameters along the time axis (timing chart) when displaying the video images as shown in FIGS. 5A to 5C. Referring to the position of the point B in the screen as illustrated in FIG. 5A, each change in the liquid crystal transmittance L, the backlight luminance B and the display luminance Y along the time axis is illustrated.

FIG. 6A represents the state where each transition of the backlight luminance B and the liquid crystal transmittance L is assumed to occur momentarily. As the transition of the liquid crystal transmittance L takes time as described above, the actual waveform becomes as illustrated in FIG. 6B. In other words, when the backlight luminance B is decreased simultaneously with the start of transition of the liquid crystal transmittance L, the display luminance Y is temporarily decreased for the period (Tb−Ta) until the end of the transition of the liquid crystal transmittance L. The decrease in the luminance as described above is unlikely to be recognized to the human eye for the reason as described above.

Meanwhile, FIG. 6C represents the state where the timing for changing the backlight luminance B is delayed by the time Tx likewise the case shown in FIG. 4C. In this case, the delay time Tx is set to be longer than the transition time (Tb−Ta) of the liquid crystal transmittance. The display luminance Y becomes higher than the original display luminance of 2000 during the delay time Tx. As a result, the illumination appears to be flashing to the human eye, thus largely deteriorating image quality.

Upon increase in the backlight luminance B (bright to dark), the delay in the backlight control causes the flashing, and deteriorates image quality. It is preferable to control the backlight in accordance with the transition start of the liquid crystal transmittance.

As described above, in the region having the backlight luminance changed from dark to bright, the timing for controlling the backlight is delayed as illustrated in FIG. 4C so as to improve the image quality by suppressing the flashing. Meanwhile, in the region having the backlight luminance changed from bright to dark, if the timing for controlling the backlight is delayed, the flashing occurs to deteriorate the image quality. Therefore, it is preferable to use the original timing without delaying the timing for controlling the backlight as shown in FIG. 6C. In this way, the trend of the change in the backlight luminance along the time axis for each region (increase/decrease) is identified. Depending on the trend, the timing for controlling the backlight is determined to ensure suppression of the flashing.

In the aforementioned example, upon increase in the backlight luminance, the delay time Tx is set to be longer than the transition time (Tb−Ta) of the liquid crystal transmittance. However, the delay time may be controlled without being limited to the aforementioned setting. The other example will be described referring to FIGS. 7A and 7B.

Figure 7A:
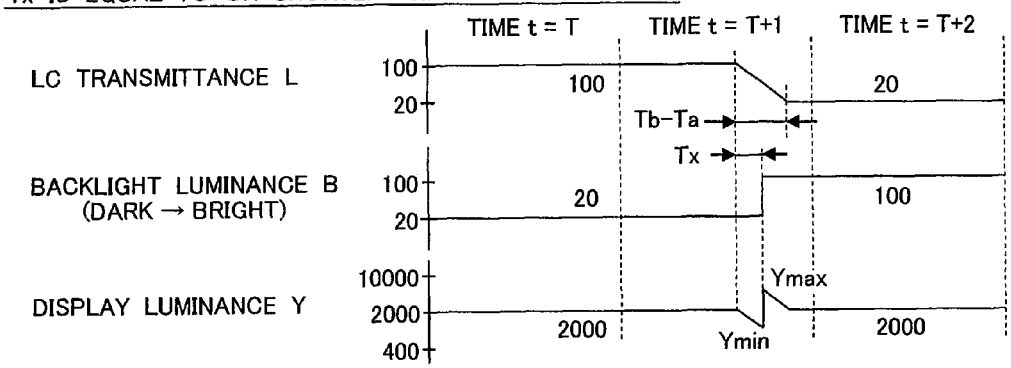
FIGS. 7A and 7B represent timing charts obtained by changing the delay period.

FIG. 7A represents an example of the operation when setting the delay time Tx to be shorter than the transition time (Tb−Ta) of the liquid crystal transmittance, that is, the timing for changing the backlight luminance is set to be earlier than the end of transition of the liquid crystal transmittance. In this case, time is taken for the display luminance Y to become higher than the original luminance. Assuming that the maximum luminance after the increase is set to Ymax, the shorter the delay time Tx becomes, the higher the maximum luminance Ymax becomes. The increase in the luminance may cause the flashing. However, it is not visually recognized as the flashing to the human eye so long as it is equal to or smaller than the tolerance. For example, if the maximum luminance Ymax after the increase is 1.2 times or lower than the original display luminance, the image quality is not largely deteriorated. The delay time Tx may be set to be shorter than the value (Tb−Ta) so long as the aforementioned requirements are satisfied.

In case of setting the time Tx to be shorter than the time (Tb−Ta), decrease in the display luminance Y may be alleviated. That is, the time is taken for the display luminance to be reduced to the value of Ymin which is lower than the original luminance just before the increase in the display luminance up to the maximum value Ymax. Unlike the flashing, the decrease in the luminance is unlikely to be visually identified, but may deteriorate image quality. The shorter the delay time Tx becomes, the closer the minimum luminance Ymin reaches the original luminance. It is preferable to set the delay time Tx while taking a balance of the maximum luminance Ymax and the minimum luminance Ymin.

Figure 7B:
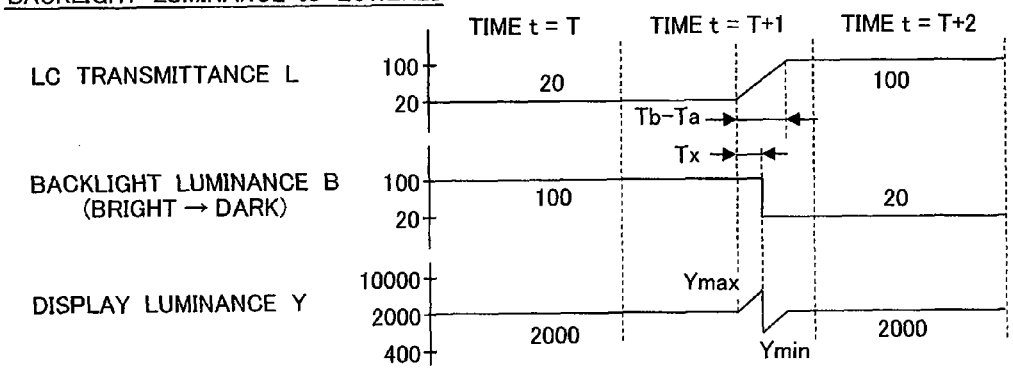

FIG. 7B represents the operation when the timing for changing the backlight luminance is delayed in case of decrease in the backlight luminance (bright to dark). In the case as illustrated in FIG. 6C, as the delay time Tx is set to be longer than the transition time (Tb−Ta) of the liquid crystal transmittance, the large flashing occurs. In this example, the delay time Tx is set to be shorter for avoiding the visual recognition as the flashing. Referring to FIG. 7B, the delay time Tx is set to be shorter than the transition time (Tb−Ta) to suppress the maximum value Ymax of the display luminance below the tolerance. Meanwhile, the time is taken for the display luminance to become the minimum value Ymin immediately from the maximum value Ymax. In such a case, it is preferable to set the delay time Tx while taking a balance of the maximum luminance Ymax and the minimum luminance Ymin.

The transition time (Tb−Ta) of the liquid crystal transmittance L changes depending on the magnitude of transition of the liquid crystal transmittance which reflects the change amount of the backlight luminance. The comparator 30 shown in FIG. 2 may be structured to determine not only the trend of change in the backlight luminance but also magnitude of the change, and to change the delay time Tx of the delay circuit 34 in accordance with the determination result. This makes it possible to execute the control while alleviating the image quality deterioration. Upon execution of such control, preferably, the relationship between the transition magnitude and the delay time Tx is preliminarily obtained and stored in the table for reference.

[Second Embodiment]

In a second embodiment, the value of the delay time Tx is fixed to the time corresponding to the single frame. In this case, the backlight luminance (dimming value) of the previous frame may be continuously used for the present frame to establish the delay time Tx for the single frame so as to omit the delay circuit.

Figure 8:
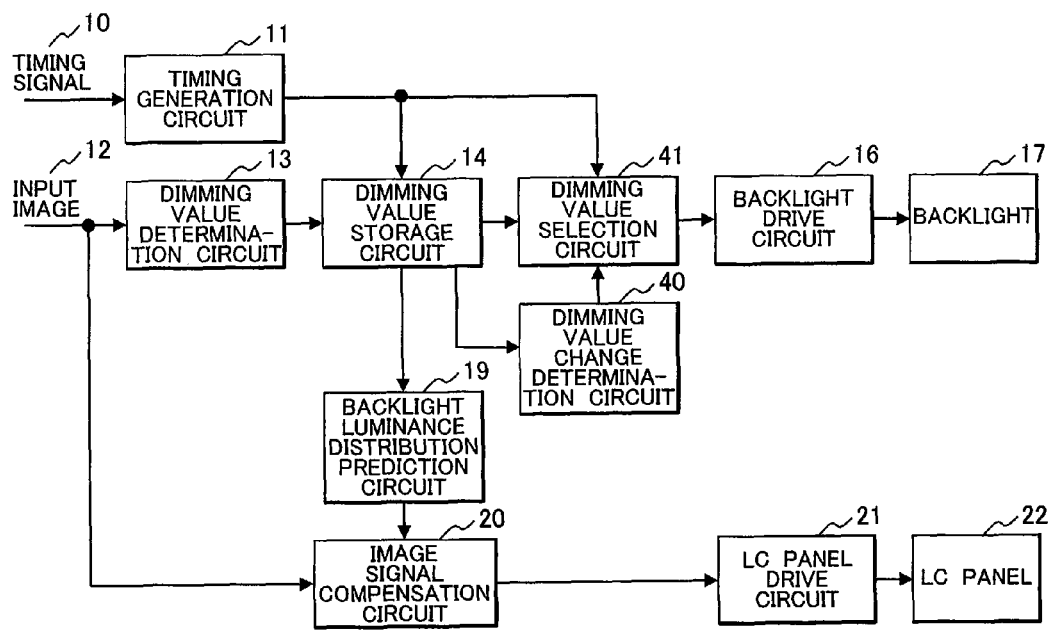
FIG. 8 is a block diagram illustrating an image display apparatus according to a second embodiment of the present invention (second embodiment)

FIG. 8 is a block diagram representing the image display apparatus according to the second embodiment of the present invention. Referring to the drawing, a dimming value change determination circuit 40 determines with respect to the trend of change in the dimming value along the time axis for each region. A dimming value selection circuit 41 selects the dimming value to be used based on the determination result from the dimming value change determination circuit 40. Structures of other circuits are the same as those described in the first embodiment (FIG. 1).

Figure 9:
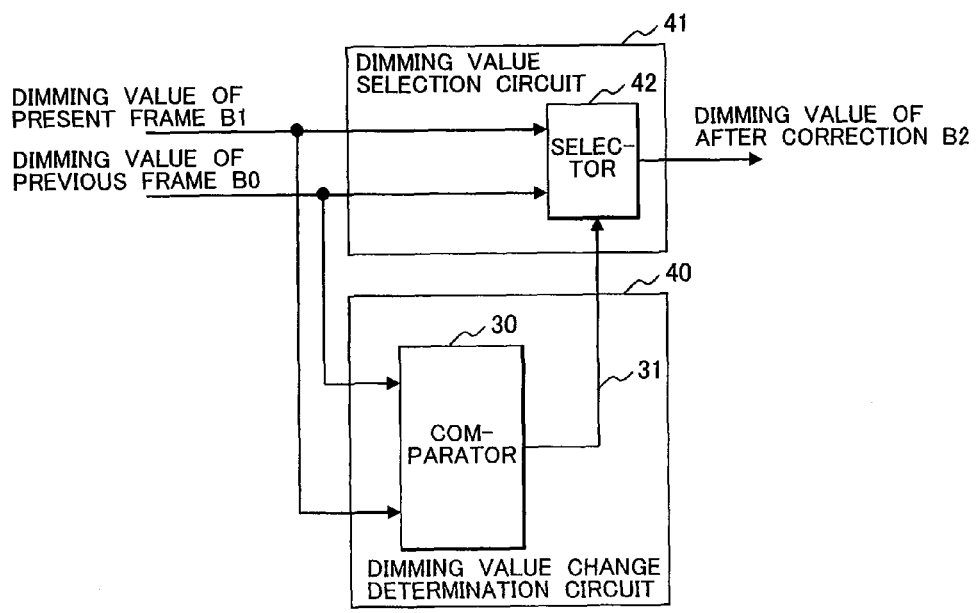
FIG. 9 represents an example of inner structures of a dimming value change determination circuit 40 and a dimming value selection circuit 41.

FIG. 9 illustrates an example of inner structures of the dimming value change determination circuit 40 and the dimming value selection circuit 41. Each number of components of the circuits 40 and 41 is set to be the same as the number of regions. Assuming that the region to be determined is set to (ax, ay), the dimming value B1 of the region (ax, ay) of the present frame transmitted from the dimming value storage circuit 14 and the dimming value B0 of the region (ax, ay) of the previous frame are input to the comparator 30. The comparator 30 compares between those dimming values B1 and B0, and transmits the comparative determination signal 31. The comparative determination signal 31 indicates a trend of change in the dimming value (increase/decrease). If the dimming value B1 of the present frame is larger than the dimming value B0 of the previous frame, that is, the backlight luminance of the region changes from dark to bright, the value "1" is output. Otherwise, the value "0" is output.

A selector 42 of the dimming value selection circuit 41 selects the dimming value B1 of the present frame when the comparative determination signal 31 is "0" so as to be output to the backlight drive circuit 16 as a dimming value 45 after correction. This indicates that the dimming value is changed to the value B1 of the present frame at the original timing. When the comparative determination signal 31 is set to "1", the dimming value B0 of the previous frame is selected, and output to the backlight drive circuit 16 as the dimming value 45 after correction. This indicates that the timing for changing the dimming value B1 of the present frame is delayed to the subsequent frame.

Figure 10:
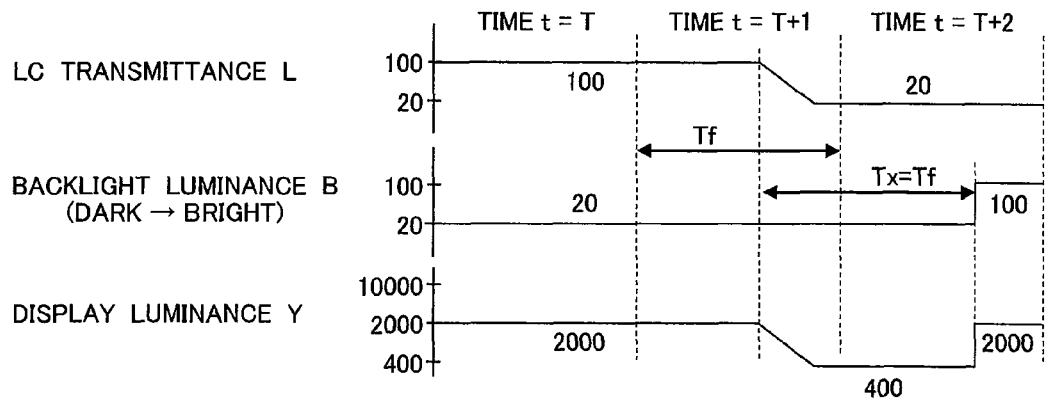
FIG. 10 represents a timing chart of the display parameter according to the second embodiment.

FIG. 10 is a timing chart of the display parameter according to the second embodiment. Specifically, if the backlight luminance is changed from dark to bright, the timing delay time Tx for changing (increasing) the dimming value of the backlight becomes equal to a frame frequency Tf. The resultant display luminance Y does not exceed the original luminance value, and is capable of preventing the flashing on the display screen. The second embodiment does not need the delay circuit for changing the switching timing of the backlight drive circuit 16, thus simplifying the circuit structure.

[Third Embodiment]

In a third embodiment, the backlight luminance (dimming value) is changed by setting an intermediate level without changing at a time. That is, in the single frame period at the switching point, the intermediate value (correction value) obtained from the backlight luminance values before/after the switching is set to reduce fluctuation of the display luminance.

Figure 11:
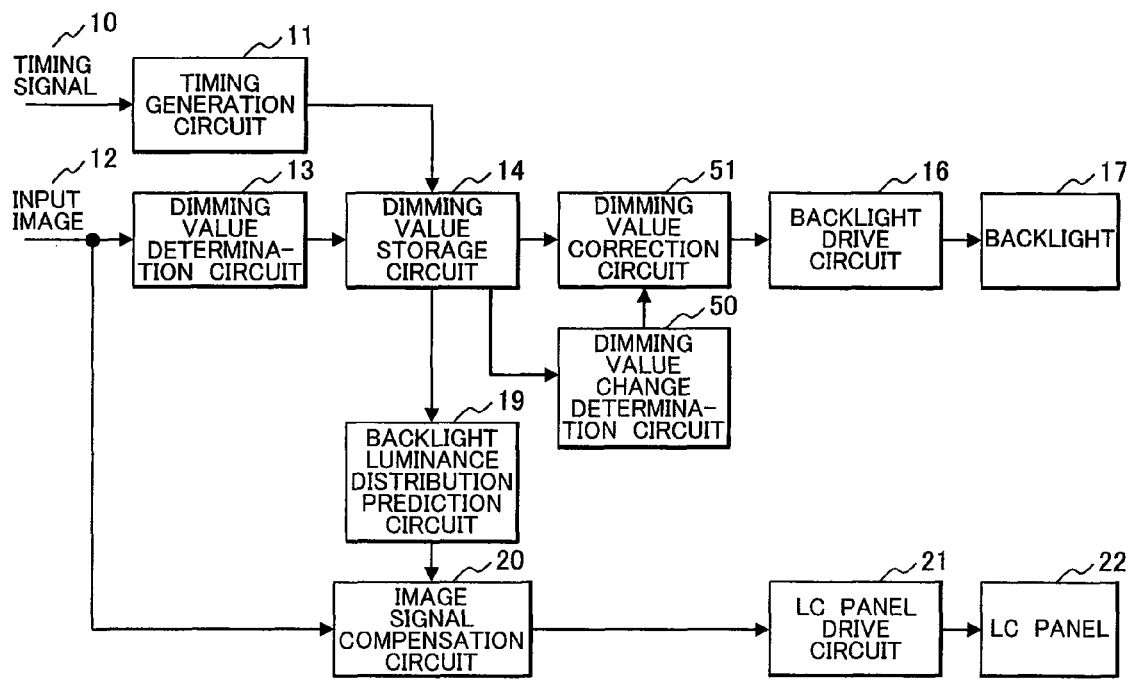
FIG. 11 is a block diagram illustrating an image display apparatus according to a third embodiment of the present invention (third embodiment)

FIG. 11 is a block diagram illustrating an image display apparatus according to a third embodiment of the present invention. Referring to the drawing, a dimming value change determination circuit 50 determines a change amount of the dimming value for each region, and outputs correction coefficients C and (1−C). A dimming value correction circuit 51 uses the correction coefficients C and (1−C) to determine the correction value. Structures of the other circuits are the same as those described in the first embodiment (FIG. 1).

Figure 12:
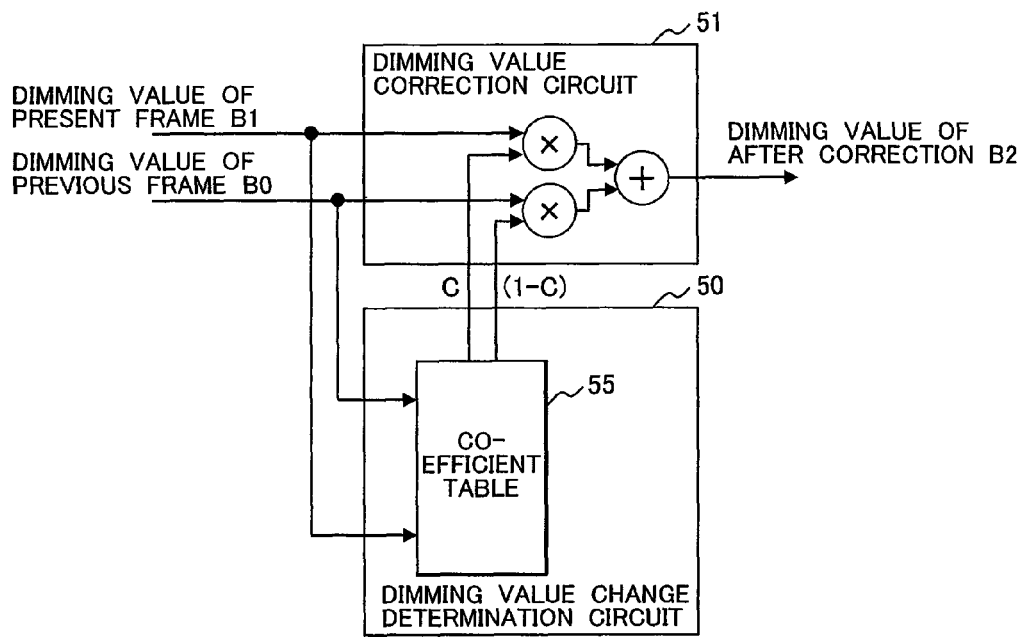
FIG. 12 represents an example of inner structures of a dimming value change determination circuit 50 and a dimming value correction circuit 51.

FIG. 12 illustrates an example of inner structures of the dimming value change determination circuit 50 and the dimming value correction circuit 51. Each number of components of those circuits is assumed to be the same as the number of regions. The dimming value B1 of the present frame in the region (ax,ay) and the dimming value B0 of the previous frame are input to the dimming value change determination circuit 50, and the correction coefficients C and (1−C) are output by referring to a coefficient table 55 using the value obtained by correlating those values as the index. If each of the dimming values has 8-bit width, the index for referring to the table becomes 16-bit width. The coefficient (1−C) may be obtained by subtraction outside the table rather than using the table. The correction coefficients C and (1−C) are transmitted to the dimming value correction circuit 51 for obtaining the dimming value B2 after correction by calculating a formula (4). The new dimming value B2 obtained by the calculation is transmitted to the backlight drive circuit 16.

$$B2 = C \times B1 + (1-C) \times B0 \quad (4)$$

Figure 13:
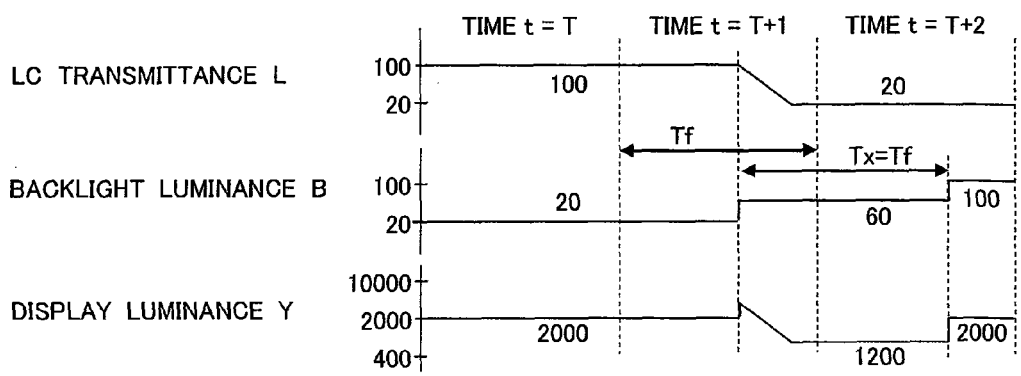
FIG. 13 represents a timing chart of the display parameter according to the third embodiment.

FIG. 13 is a timing chart of the display parameter according to the third embodiment. In the embodiment, the correction coefficient C (=1−C) is equal to 0.5 on the assumption that the dimming value B0 of the previous frame is set to 20, and the dimming value B1 of the present frame is set to 100. Then the formula (4) is calculated to obtain the dimming value B2 after correction of 60 (20×0.5+100×0.5), which is applied to the frame at the time t=T+1. In this case, the small flashing occurs in the display luminance. However, the luminance decrease becomes 1200 (20×60), which is further improved compared with the second embodiment (FIG. 10).

The ratio between the flashing of the display luminance and the luminance decrease changes depending on not only the correction coefficient C but also combination of the dimming values B0 and B1. It is preferable to set the correction coefficient C in accordance with the combination of the dimming values B0 and B1 while optimizing a balance of the flashing in the display luminance and the luminance decrease. The third embodiment may be applied not only to the case where the backlight luminance changes from dark to bright but also the case changing from bright to dark.

[Fourth Embodiment]

In a fourth embodiment, before changing the backlight luminance (dimming value), it is divided into plural stepped intermediate levels rather than the change at a time. The number of division is increased to further reduce the fluctuation degree of the display luminance.

Figure 14:
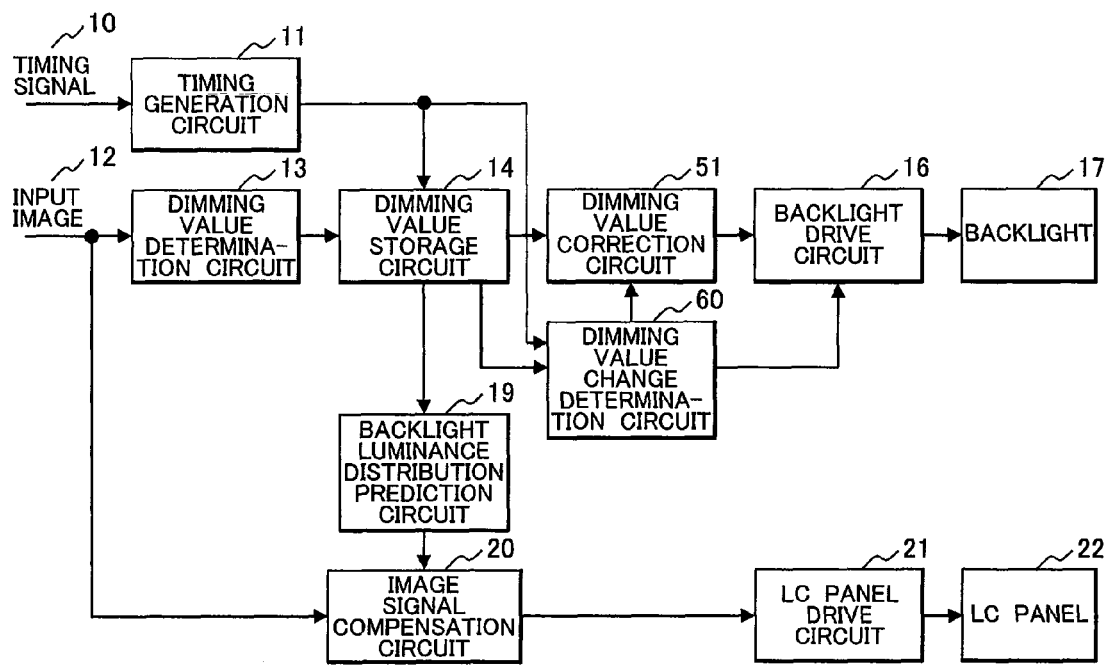
FIG. 14 is a block diagram illustrating an image display apparatus according to a fourth embodiment of the present invention (fourth embodiment)

FIG. 14 is a block diagram representing an image display apparatus according to a fourth embodiment of the present invention. Referring to the drawing, a timing signal from the timing generation circuit 11 and the dimming values of both the present frame and previous frame from the dimming value storage circuit 14 are input to a dimming value change determination circuit 60. The dimming value change determination circuit 60 uses those values to generate the update timing signal of the dimming value to be transmitted to the backlight drive circuit 16, and the correction coefficient C to be transmitted to the dimming value correction circuit 51. Any other circuits are the same as those described in the first embodiment (FIG. 1).

Figure 15:
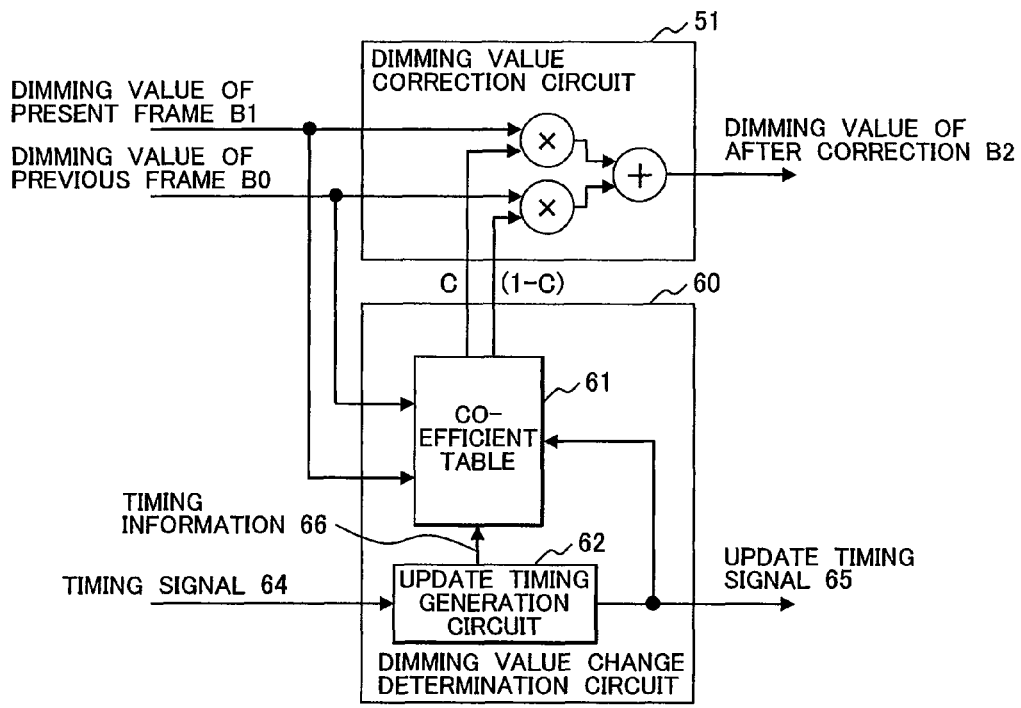
FIG. 15 represents an example of inner structures of a dimming value change determination circuit 60 and the dimming value correction circuit 51.

FIG. 15 represents an example of inner structures of the dimming value change determination circuit 60 and the dimming value correction circuit 51. The number of components of the aforementioned circuits is the same as the number of regions. An update timing generation circuit 62 generates an update timing signal 65 for determining each time width of the respective steps and timing information 66 based on a timing signal 64 from the timing generation circuit 11. The timing information 66 includes a value corresponding to the passage of time from the input of the pulse to the timing signal 64. For example, if the dimming value is updated in four stages during the single frame period, four codes "0", "1", "2" and "3" are used to indicate the respective stages.

The dimming value change determination circuit 60 determines the correction coefficients C and (1−C) for each update timing by referring a coefficient table 61 based on the timing information 66 received from the update timing generation circuit 62 besides the dimming values B1 and B0 of the present and previous frames. The correction coefficients C and (1−C) are transmitted to the dimming value correction circuit 51, and the dimming value B2 after correction is obtained by calculating the formula (4) likewise the third embodiment. When output of the coefficient table 61 changes up to four times during the single frame period, the dimming value B2 after correction changes up to 4 times. Those four dimming values B2 are sequentially transmitted to the backlight drive circuit 16 while following the update timing signal 65.

Figure 16:
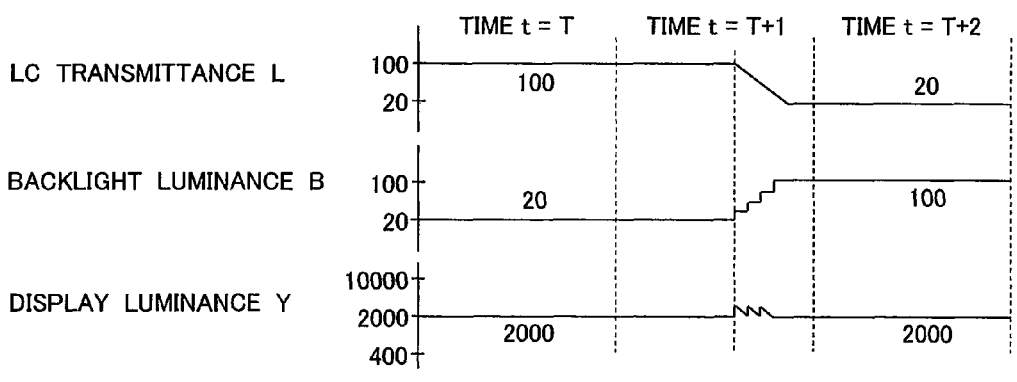
FIG. 16 represents a timing chart of the display parameter according to the fourth embodiment.

FIG. 16 represents a timing chart of the display parameter according to the fourth embodiment. From a time point when transition of the liquid crystal transmittance L starts, the backlight luminance B changes stepwise in four stages. As a result, fluctuation of the display luminance Y becomes smaller than each case of the respective embodiments 1 to 3. The number of stages is increased, and the gradient of the stage is set conforming to the transition time of the liquid crystal transmittance L to allow the display luminance Y to be held at substantially original value of 2000. The fourth embodiment may be applied to not only in the case for changing the backlight luminance from dark to bright but also the case changing from bright to dark.

The respective embodiments as described above relate to the local dimming (area control) method which divides the liquid crystal panel into plural regions, and uses the backlight formed of plural light sources for irradiating lights to the divided regions for independently controlling the light emitting luminance of the respective light sources. The control method according to the embodiment may be applied to the global dimming method for controlling the luminance of the entire screen collectively.

In the respective embodiments, the change in the backlight luminance (increase/decrease) is determined between adjacent frames (present frame and previous frame) for controlling the dimming value of the backlight. In such a case, the backlight luminance values (dimming values) may be compared between the frames interposing plural frames.

While we have shown and described several embodiments in accordance with out invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An image display apparatus for displaying an image comprising:
a display liquid crystal panel formed by arranging a plurality of liquid crystal elements each having a light transmittance variable in accordance with a signal of an input image, the liquid crystal panel being divided into a plurality of regions;
a plurality of light sources which generate light for irradiating each one of the regions of the liquid crystal panel;
a dimming value determination unit which determines a dimming value for setting a light emitting luminance of each of the light sources based on the signal of the input image in the respective regions;
an image signal compensation unit which compensates the signal of the input image supplied to the liquid crystal panel for each of the regions in accordance with the dimming value corresponding to each of the light sources, which has been determined by the dimming value determination unit; and
a drive control unit which drives and controls the light sources in accordance with the dimming value corresponding to each of the light sources, which has been determined by the dimming value determination unit,
wherein
in the regions of the liquid crystal panel where the transmittance of the liquid crystal elements when applying the signal of the input image compensated in accordance with the dimming value of a present frame transitions lower than the transmittance of the liquid crystal elements when applying the signal of the input image compensated in accordance with the dimming value of a previous frame, and where the light emitting luminance of the light sources when applying the dimming value of the present frame increases compared to the light emitting luminance of the light sources when applying the dimming value of the previous frame, the drive control unit applies, to the light sources in said regions, the dimming value of the previous frame before the end of the transition of the liquid crystal elements and the dimming value of the present frame after the end of transition of the liquid crystal elements.

2. An image display apparatus for displaying an image comprising:
a liquid crystal display panel formed by arranging a plurality of liquid crystal elements each having a light transmittance variable in accordance with a signal of an input image, the liquid crystal panel being divided into a plurality of regions;
a plurality of light sources which generate light for irradiating each of the regions of the liquid crystal panel;
a dimming value determination unit which determines a dimming value for setting a light emitting luminance of each of the light sources based on the signal of the input image in the respective regions;
an image signal compensation unit which compensates the signal of the input image supplied to the liquid crystal panel for each of the regions in accordance with the dimming value corresponding to the light sources, which has been determined by the dimming value determination unit; and
a drive control unit which drives and controls the light sources in accordance with the diming value corresponding to each of the light sources, which has been determined by the dimming value determination unit,
wherein in the regions of the liquid crystal panel where the transmittance of the liquid crystal elements when applying the signal of the input image compensated in accordance with a first diming value transitions lower than the transmittance of the liquid crystal elements when applying the signal of the input image compensated in accordance with a second dimming value which is determined before the first dimming value, and where the light emitting luminance of the light sources when applying the first dimming value increases compared to the light emitting luminance of the light sources when applying the second dimming value, the drive control unit applies, to the light sources in said regions, the second dimming value before the end of the transition of the liquid crystal elements and the first dimming value after the end of transition of the liquid crystal elements.

* * * * *